(12) United States Patent
van Zelst et al.

(10) Patent No.: US 7,561,632 B1
(45) Date of Patent: Jul. 14, 2009

(54) BEAMFORMING TECHNIQUES FOR MIMO COMMUNICATION SYSTEMS

(75) Inventors: Allert van Zelst, Woerden (NL); D. J. Richard van Nee, De Meern (NL); Vincent K. Jones, Redwood City, CA (US)

(73) Assignee: Qualcomm Incorporated, San Diego, CA (US)

( * ) Notice: Subject to any disclaimer, the term of this patent is extended or adjusted under 35 U.S.C. 154(b) by 631 days.

(21) Appl. No.: 11/414,152

(22) Filed: Apr. 27, 2006

Related U.S. Application Data

(60) Provisional application No. 60/675,985, filed on Apr. 28, 2005.

(51) Int. Cl.
*H04B 7/02* (2006.01)
(52) U.S. Cl. ..................................... 375/267
(58) Field of Classification Search ................. 375/267
See application file for complete search history.

(56) References Cited

U.S. PATENT DOCUMENTS

| | | | | |
|---|---|---|---|---|
| 6,144,711 | A * | 11/2000 | Raleigh et al. | 375/347 |
| 2004/0014501 | A1 * | 1/2004 | Kuwahara et al. | 455/561 |
| 2005/0026566 | A1 * | 2/2005 | Dabak et al. | 455/67.11 |
| 2006/0120469 | A1 * | 6/2006 | Maltsev et al. | 375/260 |

OTHER PUBLICATIONS

Haynes, "A Primer on Digital Beam-forming", Spread Spectrum Signal Processing, dated Mar. 26, 1998, downloaded at www.spectrumsignal.com/publications/beamform_primer.pdf on Jul. 16, 2006.
Sadowksy et al., "WWiSE Preambles and MIMO Beamforming?", dated Jan. 15, 2005 downloaded at http://www.ieee802.org/11/DocFiles/05/11-05-1645-02-000n-preambles-beamforming-wwise-proposal.ppt on Jul. 16, 2006.
Theon, et al. "Adaptive Loading for OFDM/SDMA-Based Wireless Networks", IEEE Transactions on Communications, vol. 50, No. 11, Nov. 2002.
Xie, "On Adaptive Transmission, Signal Detection and Channel Estimation for Multiple Antenna Systems", Dissertation for Doctor of Philosophy, Electrical Engineering for Texas A&M University, Aug. 2004.

* cited by examiner

*Primary Examiner*—Don N Vo
(74) *Attorney, Agent, or Firm*—Turocy & Watson, LLP

(57) ABSTRACT

Improved beamforming techniques are provided for use in MIMO (multiple-input, multiple-output) communication systems, including MIMO-OFDM systems. The techniques include: (1) determining beamforming (BF) weights using a smoothed singular value decomposition (SVD) of the channel matrix; (2) determining BF weights using a power-optimized minimum mean-square error (MMSE) technique when the number of available transmit antennas exceeds the number of signal streams; and (3) determining BF weights using a hybrid SVD-MMSE technique. Additional techniques for reducing the impulse response length of the BF weights and/or normalizing the power per transmit antenna or per data stream may be used in conjunction with these or other beamforming techniques.

28 Claims, 5 Drawing Sheets

US 7,561,632 B1

BEAMFORMING TECHNIQUES FOR MIMO COMMUNICATION SYSTEMS

CROSS-REFERENCES TO RELATED APPLICATIONS

This application claims the benefit of U.S. Provisional Application No. 60/675,985, filed Apr. 28, 2005, entitled "Improved Beamforming for MIMO-OFDM Wireless Communications," which disclosure is incorporated herein by reference for all purposes.

BACKGROUND OF THE INVENTION

The present invention relates in general to wireless communication systems, and in particular to beamforming techniques usable in multiple-input, multiple output (MIMO) wireless communication systems.

As used herein, the term "beamforming" refers to a variety of techniques for exploiting interference effects to improve reception of a signal. Traditionally, beamforming entails sending the same signal from multiple antennas with appropriate phase and/or amplitude adjustments such that a strong signal is detected at a receiver.

In MIMO (multiple input, multiple output) communication systems, a single data stream is divided into multiple spatial streams that are transmitted over multiple antennas in parallel. The receiver receives a linear combination of the spatial streams, which it decodes to reconstruct the original data stream. Parallel transmission of multiple spatial streams generally improves the data rate of the communication system as compared to more traditional SISO (single-input, single-output) systems. Further increases in the data rate can be attained by using orthogonal frequency division multiplexing (OFDM) or similar techniques within each spatial stream.

Beamforming may be employed in a MIMO system. With beamforming, instead of using each transmit antenna to transmit a spatial stream, the transmit antennas each transmit a linear combination of the spatial streams, with the combination being chosen so as to optimize the response at the receiver. More specifically, consider a MIMO system with a number ($N_t$) of transmit antennas and a number ($N_r$) of receive antennas that transmits a number ($N_{ss}$) of spatial streams in parallel using a number $N_c$ of OFDM subcarriers n. In the absence of beamforming, the $N_r$-component vector y(n) of signals received for subcarrier n may be expressed as:

$$y(n)=H(n)x(n)+n(n), \quad \text{(Eq. 1)}$$

where x(n) is an $N_t$-component vector of signals transmitted for subcarrier n, H(n) is an $N_r \times N_t$ matrix representing the effect of the communication channel for subcarrier n, and n(n) is an $N_r$-component vector representing the noise seen per receive antenna for subcarrier n.

A beamforming transmitter applies weights to signals x(n) prior to transmission, where each weight is a complex scalar. In general, assuming now that x(n) is an $N_{ss}$-component vector, the beamforming weights for subcarrier n are represented as an $N_t \times N_{ss}$ matrix W(n), and Eq. 1 becomes:

$$y(n)=H(n)W(n)x(n)+n(n) \quad \text{(Eq. 2)}$$

Various beamforming techniques for MIMO communication systems are known in the art. In general, such techniques can be classified in two categories. Techniques in one category attempt to equalize the channel at the transmitter, e.g., by selecting W(n) such that the product H(n)W(n) approximates an identity matrix, so that an AWGN-like performance is seen at the receiver. Minimum mean-square error (MMSE) techniques, e.g., as described in U.S. Pat. No. 6,144,711, are of this kind.

MIMO beamforming techniques in another category attempt to orthogonalize the channel at the transmitter side, e.g., by selecting W(n) such that the product H(n)W(n) is approximately a diagonal matrix, in order to improve receiver performance. Singular value decomposition (SVD) techniques are of this kind.

The extent to which beamforming improves receiver performance depends on how the weights W are selected. Improvements in beamforming techniques will result in improved performance and are therefore desirable.

BRIEF SUMMARY OF THE INVENTION

Embodiments of the present invention provide improved beamforming techniques for use in MIMO (multiple-input, multiple-output) communication systems, including MIMO-OFDM (orthogonal frequency division multiplexing) systems. In some embodiments, beamforming (BF) weights are determined using a smoothed singular value decomposition (SVD) of the channel matrix; the smoothing advantageously reduces fluctuations in the BF weights, which in turn reduces the time-domain length of the weights. In other embodiments, BF weights are determined using a power-optimized minimum mean-square error (MMSE) technique for instances where the number of available transmit antennas exceeds the number of signal streams to be transmitted in parallel. In still other embodiments, BF weights are determined using a hybrid SVD-MMSE technique. Additional techniques that reduce the impulse response length of the BF weights and/or normalize the power per transmit antenna or per data stream may be used in conjunction with any of the above or other beamforming techniques.

According to one aspect of the present invention, a beamforming method is provided for a source device in a MIMO communication system in which the source device transmits, via a number $N_t$ of transmit antennas, a beamformed signal to a sink device. A set of beamforming weights to be applied to a number $N_{ss}$ of signal streams to generate a number $N_t$ of transmit streams is determined. (For MIMO systems, the number $N_{ss}$ is at least two, and it is not required that $N_{ss}$ and $N_t$ be equal.) To determine the beamforming weights, a singular value decomposition is computed for a channel matrix H associated with a communication channel from the source to the sink. A preliminary weight matrix is defined, based on the singular value decomposition. Each column of the preliminary weight matrix is phase rotated such that a phase of a reference element in each column is equal to a target phase, thereby generating a beamforming weight matrix. The beamforming weight matrix is applied to the $N_{ss}$ signal streams to generate the number $N_t$ of transmit streams. The $N_t$ transmit streams are then transmitted via the $N_t$ transmit antennas.

In embodiments where the source device transmits signals to the sink device using multiple subcarriers (e.g., OFDM subcarriers), the set of beamforming weights may be determined independently for each of the subcarriers. During this process, phase rotation of each column of the preliminary weight matrix is advantageously performed for respective weight matrices associated with each one of the subcarriers, using elements in corresponding locations in the respective weight matrices as the reference elements for each weight matrix.

According to another aspect of the present invention, a beamforming method is provided for a source device in a MIMO communication system in which the source device transmits, via a number $N_t$ of transmit antennas, a beamformed signal to a sink device. A beamforming weight matrix W to be applied to a number $N_{ss}$ of signal streams to generate a number $N_t$ of transmit streams is determined. (For MIMO systems, the number $N_{ss}$ is at least two.) To determine the beamforming weights, a beamforming weight matrix W is computed using a minimum mean square error technique. If the number $N_{ss}$ of signal streams is less than a number $N_r$ of receive antennas, the beamforming weight matrix W is advantageously optimized by selecting a number $N_{ss}$ of columns in the beamforming weight matrix for which a minimum power is required to equalize the channel. The beamforming weight matrix W (optimized if appropriate) is applied to the $N_{ss}$ signal streams to generate the number $N_t$ of transmit streams. The $N_t$ transmit streams are transmitted via the $N_t$ transmit antennas.

In embodiments where the source device transmits signals to the sink device using a plurality of subcarriers (e.g., OFDM subcarriers), a beamforming weight matrix W(n) is advantageously computed for each of the subcarriers. To select the $N_{ss}$ of columns in the beamforming weight matrix W(n) for each subcarrier, a power value $P_c(n)$ for each column of each beamforming weight matrix W(n) is determined. The respective power values $P_c(n)$ of corresponding columns in the beamforming weight matrices W(n) are averaged over all subcarriers n. In each beamforming weight matrix W(n), the $N_{ss}$ columns with the lowest average power values are selected.

According to another aspect of the present invention, a beamforming method is provided for a source device in a MIMO communication system in which the source device transmits, via a number $N_t$ of transmit antennas, a beamformed signal to a sink device. A beamforming weight matrix W to be applied to a number $N_{ss}$ of signal streams to generate a number $N_t$ of transmit streams is determined. (For MIMO systems, the number $N_{ss}$ is at least two.) To determine the beamforming weights, a singular value decomposition of a channel matrix associated with a communication channel from the source to the sink is determined. The singular value decomposition includes a singular value matrix D and at least one unitary matrix U. Based on inverting a product matrix obtained from the unitary matrix U and the singular value matrix D, a beamforming weight matrix W is determined. The beamforming weight matrix W is applied to the $N_{ss}$ signal streams to generate the $N_t$ transmit streams, and the $N_t$ transmit streams are transmitted via the $N_t$ transmit antennas.

In embodiments where the source device transmits signals to the sink device using multiple subcarriers (e.g., OFDM subcarriers), the acts of computing the singular value decomposition and determining the beamforming weight matrix W can be performed independently for each of the plurality of subcarriers.

According to yet another aspect of the invention, a beamforming method is provided for a source device in a MIMO communication system in which the source device transmits, via a number $N_t$ of transmit antennas, a beamformed signal to a sink device. A set of beamforming weights W to be applied to a number $N_{ss}$ of signal streams to generate a number $N_t$ of transmit streams is determined. (For MIMO systems, $N_{ss}$ is at least two.) An impulse response length of the beamforming weights W is truncated. The truncated-response beamforming weights are applied to the $N_{ss}$ signal streams to generate the $N_t$ transmit streams, and the $N_t$ transmit streams are transmitted via the $N_t$ transmit antennas.

In embodiments where the source device transmits signals to the sink device using multiple subcarriers (e.g., OFDM subcarriers), determining a set of beamforming weights W is advantageously performed for each subcarrier, thereby generating a plurality of beamforming weight matrices W(n). To truncate the impulse response length, the beamforming weight matrices W(n) can be transformed to the time domain, thereby producing a plurality of time domain weight matrices. The time domain weight matrices are truncated at a cutoff time, and the truncated time domain weight matrices are transformed back to a frequency domain, thereby producing a set of truncated-response beamforming weight matrices.

According to still another aspect of the present invention, a beamforming method is provided for a source device in a MIMO communication system in which the source device transmits, via a number $N_t$ of transmit antennas, a beamformed signal to a sink device. A set of beamforming weights W to apply to a number $N_{ss}$ of signal streams to generate a number $N_t$ of transmit streams is determined. (For MIMO systems, the number $N_{ss}$ is at least two.) The set of beamforming weights W is renormalized to optimize power required per signal stream. The renormalized beamforming weights are applied to the $N_{ss}$ signal streams to generate the number $N_t$ of transmit streams, and the $N_t$ transmit streams are transmitted via the $N_t$ transmit antennas.

According to still another aspect of the present invention, a beamforming method is provided for a source device in a MIMO communication system in which the source device transmits, via a number $N_t$ of transmit antennas, a beamformed signal to a sink device. A set of beamforming weights W to apply to a number $N_{ss}$ of signal streams to generate a number $N_t$ of transmit streams is determined. (For MIMO systems, the number $N_{ss}$ is at least two.) The set of beamforming weights W is renormalized to optimize power required per transmit antenna. The renormalized beamforming weights are applied to the $N_{ss}$ signal streams to generate the number $N_t$ of transmit streams, and the $N_t$ transmit streams are transmitted via the $N_t$ transmit antennas.

The following detailed description together with the accompanying drawings will provide a better understanding of the nature and advantages of the present invention.

DETAILED DESCRIPTION OF THE INVENTION

Embodiments of the present invention provide improved beamforming techniques for use in MIMO (multiple-input, multiple-output) communication systems, including MIMO- OFDM (orthogonal frequency division multiplexing) systems. In some embodiments, beamforming (BF) weights are determined using a smoothed singular value decomposition (SVD) of the channel matrix; the smoothing advantageously reduces fluctuations in the BF weights, which in turn reduces the time-domain length of the weights. In other embodiments, BF weights are determined using a power-optimized minimum mean-square error (MMSE) technique for instances where the number of available transmit antennas exceeds the number of signal streams to be transmitted in parallel. In still other embodiments, BF weights are determined using a hybrid SVD-MMSE technique. Additional techniques that reduce the impulse response length of the BF weights and/or normalize the power per transmit antenna or per data stream may be used in conjunction with any of the above or other beamforming techniques.

The following notational convention is used herein: italicized letters (e.g., n) represent scalar quantities, boldface lowercase letters (e.g., x) represent vector quantities, boldface uppercase letters (e.g., W) represent matrices, $W^H$ represents the Hermetian transpose of a matrix W, and $W^{-1}$ represents the inverse of a matrix W.

System Overview

Figure 1:
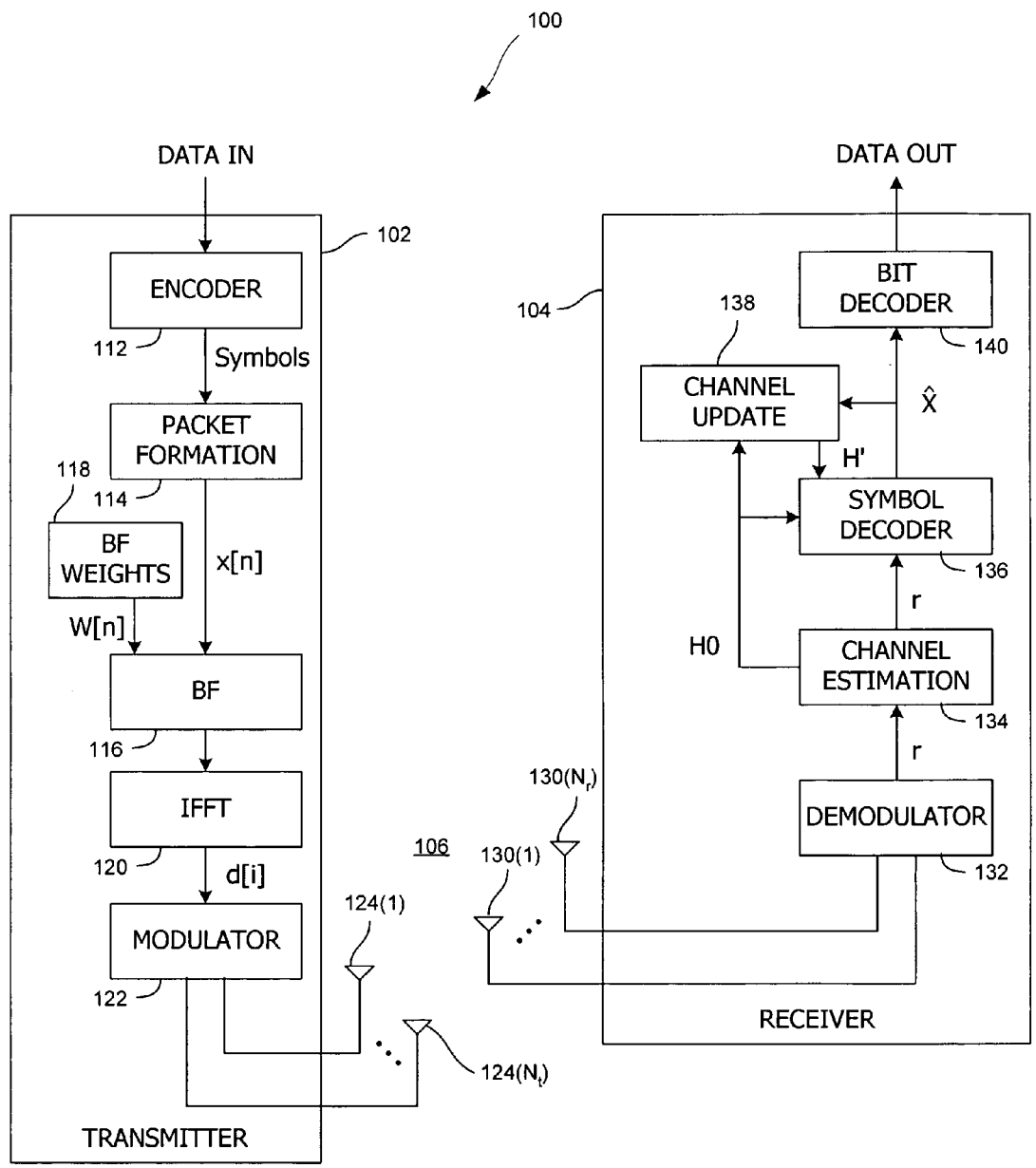
FIG. 1 is a simplified block diagram of a MIMO communication system suitable for implementing beamforming according to an embodiment of the present invention.

FIG. 1 is a simplified block diagram of a MIMO communication system 100 suitable for implementing beamforming according to an embodiment of the present invention. MIMO communication system 100 includes a transmitter system 102 and a receiver system 104 communicating via a channel 106. Transmitter system 102 includes an encoding block 112 that receives an input data stream and encodes it into a sequence of symbols (complex values) to be transmitted, a packet formation block 114 that formats the encoded data into packets for transmission, a beamforming (BF) block 116 that adjusts the symbols to effect beamforming in accordance with a BF weights supplied by BF weights block 118, an IFFT (inverse Fast Fourier Transform) block 120 that applies the symbol data as modulation to a number of subcarriers, and a modulator block 122 that modulates the IFFT output according to a carrier frequency for transmission via a number ($N_t$) of transmit antennas 124. Herein, multiple instances of like objects are denoted with reference numbers identifying the object and parenthetical numbers identifying the instance where needed.

Receiver system 104 includes a demodulator 132 for demodulating a signal received via a number ($N_r$) of receive antennas 130, a channel estimation block 134 that determines channel effects from the training data, a decoder 136, and a channel update block 138.

In one embodiment, communication system 100 is implemented as an OFDM (orthogonal frequency division multiplexing) system, in which signals are split into several narrowband channels at different subcarrier frequencies selected to minimize interference between the channels. In some embodiments, communication system 100 is operable in various modes, one of which may be compliant with the forthcoming IEEE 802.11n standard. In other modes, system 100 may be compliant with various other IEEE 802.11 standards, including but not limited to IEEE 802.11a, 802.11b, 802.11g and so on.

As shown in FIG. 1, input data is provided (generally as a bit stream) to encoder 112, which encodes the data stream into a sequence of complex numbers (symbols). In some embodiments, encoding may include forward error correction (FEC) encoding (which involves introducing redundant bits into the data stream), bit interleaving, and mapping groups of bits to symbols in a signaling constellation (using, e.g., any of BPSK (binary phase shift keying), QPSK (quadrature phase-shift keying), 16 QAM (quadrature amplitude modulation), or 64 QAM). Numerous encoding and mapping techniques are known in the art and may be implemented in encoder 112. In some embodiments, encoder 112 may also be controllable via various parameters to select, e.g., different error correction schemes or different signaling constellations. A detailed description of encoding techniques is omitted as not being critical to understanding the present invention.

After mapping, the symbols are provided to packet formation block 114, which groups the symbols into packets for transmission. Packet formation block 114 may also add additional symbols into the data stream, such as a conventional IEEE 802.11a preamble. In some embodiments of system 100, the DC subcarrier and/or certain other subcarriers are advantageously not used for data transmission. In addition, some of the subcarriers may be used to transmit pilot tones. As is known in the art, packet formation block 114 may insert appropriate complex values at unused or pilot subcarrier locations in each symbol vector x to comply with an applicable standard. In other embodiments, any or all of the subcarriers n may be used to transmit data, thereby increasing the data rate.

Packet formation block 114 supplies symbol vectors x to BF block 116. Each symbol vector x includes a number $N_{ss}$ of complex scalars x, where $N_{ss}$ is the number of parallel signal streams in the MIMO system (also referred to herein as the multiplicity of the system). In a MIMO OFDM system, packet formation block 114 supplies symbol vectors x for each of a number $N_c$ of OFDM subcarriers. As used herein, x(n) denotes the $N_{ss} \times 1$ vector to be transmitted on OFDM subcarrier n.

BF block 116 applies a BF weight matrix W(n) to each vector x(n) to produce:

$$x_{BF}(n) = W(n)x(n), \quad \text{(Eq. 3)}$$

where $x_{BF}(n)$ is an $N_t \times 1$ vector of complex numbers. In one embodiment, matrix W(n) has dimensions $N_t \times N_{ss}$, where $N_t$ is the number of transmit antennas 124 being used to send the $N_{ss}$ signal streams. The BF weight matrices W(n) are advantageously determined using one or more of the beamforming techniques described below.

Packet formation block 114 provides groups of symbols to IFFT module 120, which uses the group of symbols to modulate a group of $N_c$ OFDM subcarriers. In general, if complex symbols $x_{BF}(n)$, for n=0, 1, ..., $N_c$-1 are provided, IFFT module 120 generates $N_c$ time-domain samples d(i) using a conventional Inverse Fast Fourier Transform (IFFT):

$$d(i) = \sum_{n=0}^{N_c} x_{BF}(n) \exp\left(j \frac{2\pi i n}{N_c}\right), \quad \text{(Eq. 4)}$$

where $j = \sqrt{-1}$.

Modulator 122 uses the sample values provided by IFFT module 120 to modulate an RF carrier wave for each transmit antenna and delivers the resulting signal to the $N_t$ transmit antennas 124 for transmission.

At receiver system 104, the transmitted signal is received, and the reverse of the transmitter process occurs to reconstruct the input data stream. Thus, demodulator 132 receives the signals via $N_r$ receive antennas 130, removes the RF modulation, and provides a sequence of samples to the remaining components. In one embodiment, groups of samples are provided as an $N_r$-component vector r(i) (with complex components) representing the signal sample from each receive antenna 130 at a given time. Each component of r(i) is a linear combination of signals from all of the $N_t$ transmitters, with each signal being affected by (generally different) channel properties.

Channel estimation block 134 is configured to detect a sample stream r(i) corresponding to a training sequence (e.g., an IEEE 802.11-compliant training sequence) and to use the detected training samples to generate channel estimates. Recognition of the training sequence may be accomplished using a variety of techniques, including conventional techniques. The channel estimates are advantageously provided as a set of $N_c$ matrices H(n), where each matrix H(n) has $N_r \times N_t$ (or in some embodiments $N_r \times N_{ss}$) complex-valued components that represent the channel effect for a particular transmit/receive pair (or signal-stream/receive pair) for a given subcarrier n. Channel estimation block 134 may implement any algorithm for generating channel-estimate matrices H(n). In some embodiments, channel estimation block 134 may also include additional components adapted to estimate other error corrections from the training data, e.g., clock and carrier frequency offsets, noise power, and the like. Particular algorithms for estimating channel effects and/or other error corrections are not critical to the present invention, and a detailed description is omitted.

Symbol decoder block 136 applies the channel estimates H(n) (as well as any other corrections) to the samples r(i) and generates a reconstructed symbol stream x̂(n) that ideally corresponds to the sequence of symbol vectors x(n) provided to BF block 116. This symbol stream is provided to bit stream block 140, which reverses the keying, interleaving, and encoding processes of encoder block 112 to generate an output bit stream. Symbol decoder block 136 and bit stream block 140 may be implemented using a variety of techniques, and a detailed description is omitted as not being critical to understanding the present invention.

In some embodiments, the channel estimates H(n), the decoded symbols x̂(n), and the received samples r(i) are provided to a channel update module 138. Channel update module 138 uses the received samples r(i) and the decoded symbols x̂(n) to detect changes in the channel properties that may occur during transmission of a packet. Channel properties may be affected by various environmental changes, such as motion of a mobile transmitter system 102 and/or receiver system 104, operation of other devices in the area, and so on. Channel estimation block 134 can be expected to update the channel estimates to reflect such changes when the next training sequence is received, but in this embodiment, channel estimation block 134 does not detect changes that may occur while the data portion of a packet is being transmitted. Channel update module 138 may employ adaptive feedback mechanisms or the like to compensate for motion or other environmental changes.

It is to be understood that the MIMO communication system described herein is illustrative and that variations and modifications are possible. Any number of transmit antennas $N_t$ and any number of receive antennas $N_r$ may be provided, and it is not required that $N_t$ and $N_r$ be equal. In addition, some or all components may be replaced with components having a single transmit antenna and/or a single receive antenna. Further, the number of signal streams $N_{ss}$ (also referred to herein as multiplicity of the MIMO communication system) need not be equal to either $N_t$ or $N_r$. Any number $N_c$ of subcarriers may be used in an OFDM system, and some systems may have only one subcarrier.

The design of various system components, as well as methods used for forward error correction, interleaving, and modulation can be varied.

Further, those of ordinary skill in the art will appreciate that a transmitter and a receiver may both be implemented in the same device, so that one device can operate at times as a transmitter and at other times as a receiver. Such devices often use the same antenna(s) for both transmission and reception. Herein, the term "source" is used to denote a device in a MIMO communication system that is applying beamforming, and the term "sink" is used to denote a device at the other end of the communication link from the source. "Downlink" refers to the communication channel from source to sink, while "uplink" refers to the communication channel from sink to source.

Beamforming Overview

In the beamforming techniques described herein, the source has information as to the channel characteristics of the link between the source and the sink. For instance, the source may store channel matrices H(n), which may be obtained in the manner described above. The source uses this channel information to modify the transmitted signal by determining and applying a BF weight matrix W(n) as shown in Eq. 1 so as to enhance performance of the sink. In some techniques described herein, beamforming attempts to equalize the channel at the source to reduce fading at the sink. In other techniques described herein, beamforming attempts to orthogonalize the channel at the source in order to improve performance at the sink.

A source may obtain information as to channel characteristics in various ways. For instance, in some embodiments, the sink (e.g., receiver 104 of system 100) includes a channel estimation block 134 that generates channel matrices H(n). The sink may transmit the channel matrices to the source at appropriate intervals, and the source may store that information, e.g., in BF weights module 118 of transmitter 102, for use in generating BF weights.

In other embodiments, the source may compute its own channel estimates for the uplink channel, e.g., at times when it is operating as a receiver receiving signals from the sink device, and use those estimates to determine properties of the downlink channel. For instance, channel reciprocity might be assumed. Appropriate calibration to compensate for differences in the transmit and receive path electronics of the source and/or sink devices may be applied.

The above and numerous other techniques for providing a beamforming source with information as to the characteristics of the downlink channel are known in the art. A particular technique is not critical to the present invention, and accordingly a detailed description of such techniques has been omitted.

Smooth SVD Beamforming

In one embodiment of the present invention, BF weight matrices W(n) are determined using a "smooth SVD" technique. SVD, or singular value decomposition, is a known beamforming technique. "Smooth SVD" modifies a conventional SVD algorithm in a manner that reduces fluctuations in the BF weights, which in turn advantageously reduces the time-domain length of the weights.

Figure 2:
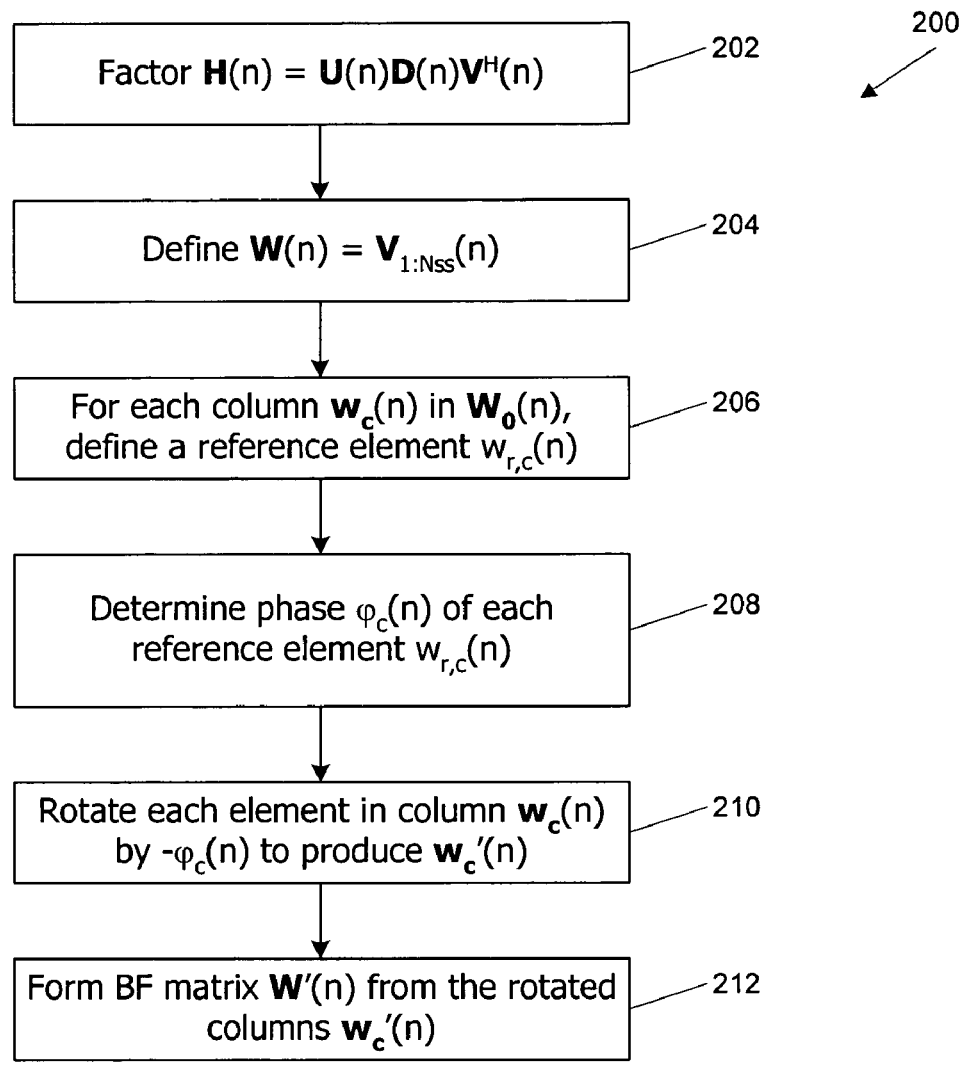
FIG. 2 is a flow diagram of a smooth singular value decomposition (SVD) beamforming process according to an embodiment of the present invention.

FIG. 2 is a flow diagram of a smooth SVD beamforming process 200 according to an embodiment of the present invention. At step 202, the channel matrix H(n) is factored into a product of three matrices:

$$H(n)=U(n)D(n)V^H(n), \quad \text{(Eq. 5)}$$

where U(n) and V(n) are unitary matrices with dimensions $N_r \times N_r$ and $N_t \times N_t$, respectively, and D(n) is an $N_r \times N_t$ matrix with the singular values $\sigma_1, \ldots, \sigma_K$ of H(n) on its main diagonal. For instance, if $N_t > N_r$, then D(n) has the structure:

$$D(n) = \begin{pmatrix} \sigma_1 & 0 & \cdots & 0 & 0 & \cdots & 0 \\ 0 & \ddots & \ddots & \vdots & \vdots & & \vdots \\ \vdots & \ddots & \ddots & 0 & \vdots & & \vdots \\ 0 & \cdots & 0 & \sigma_K & 0 & \cdots & 0 \end{pmatrix} \quad \text{(Eq. 6)}$$

Conventional SVD techniques may be used to factor H(n) in accordance with Eq. 5.

At step 204, an unsmoothed BF weight matrix $W_0(n)$ is formed by taking the first $N_{ss}$ columns of the unitary matrix V(n), that is:

$$W_0(n) = V_{1:N_{ss}}(n), \quad \text{(Eq. 7)}$$

where the subscript $1:N_{ss}$ denotes the first $N_{ss}$ columns. In conventional SVD beamforming, weight matrix $W_0(n)$ would be used directly. Process 200, however, includes additional smoothing steps.

More specifically, at step 206, a reference element $w_{r,c}(n)$ (where r is a row index and c is a column index) is chosen for each column $w_c(n)$ in the matrix $W_0(n)$. For each column c, any row index r may be used to define the reference element; in one embodiment, r=1 is chosen for every column c. In other embodiments, a different row index r may be chosen, and general, different row indices r may be chosen for different columns c. It should be noted that the same set of reference elements is advantageously used for all $W_0(n)$ matrix for all subcarriers n.

The reference elements $w_{r,c}(n)$ are complex scalars. At step 208, the phase $\Psi_{r,c}(n)$ of each reference element $w_{r,c}(n)$ is determined. At step 210, each element in column $w_c(n)$ is rotated by a phase shift of $-\Psi_{r,c}(n)$ to produce a column $w_c'(n)$. At step 212, a smooth BF weight matrix W(n) is formed from the columns $w_c'(n)$.

It will be appreciated that the smooth SVD process described herein is illustrative and that variations and modifications are possible. Steps described as sequential may be executed in parallel, order of steps may be varied, and steps may be modified or combined. For example, it should be noted that, as a result of the rotation at step 210, the reference elements $w_{r,c}'(n)$ of the matrix W(n) for every subcarrier n all have a phase of zero. In some alternative embodiments, the phase shift is determined such that the reference elements $w_{r,c}'(n)$ all have a common non-zero phase.

Power-Optimized MMSE Beamforming

In another embodiment of the present invention, BF weight matrices W(n) are determined using power optimization in conjunction with a well-known minimum mean-square error (MMSE) technique.

Figure 3:
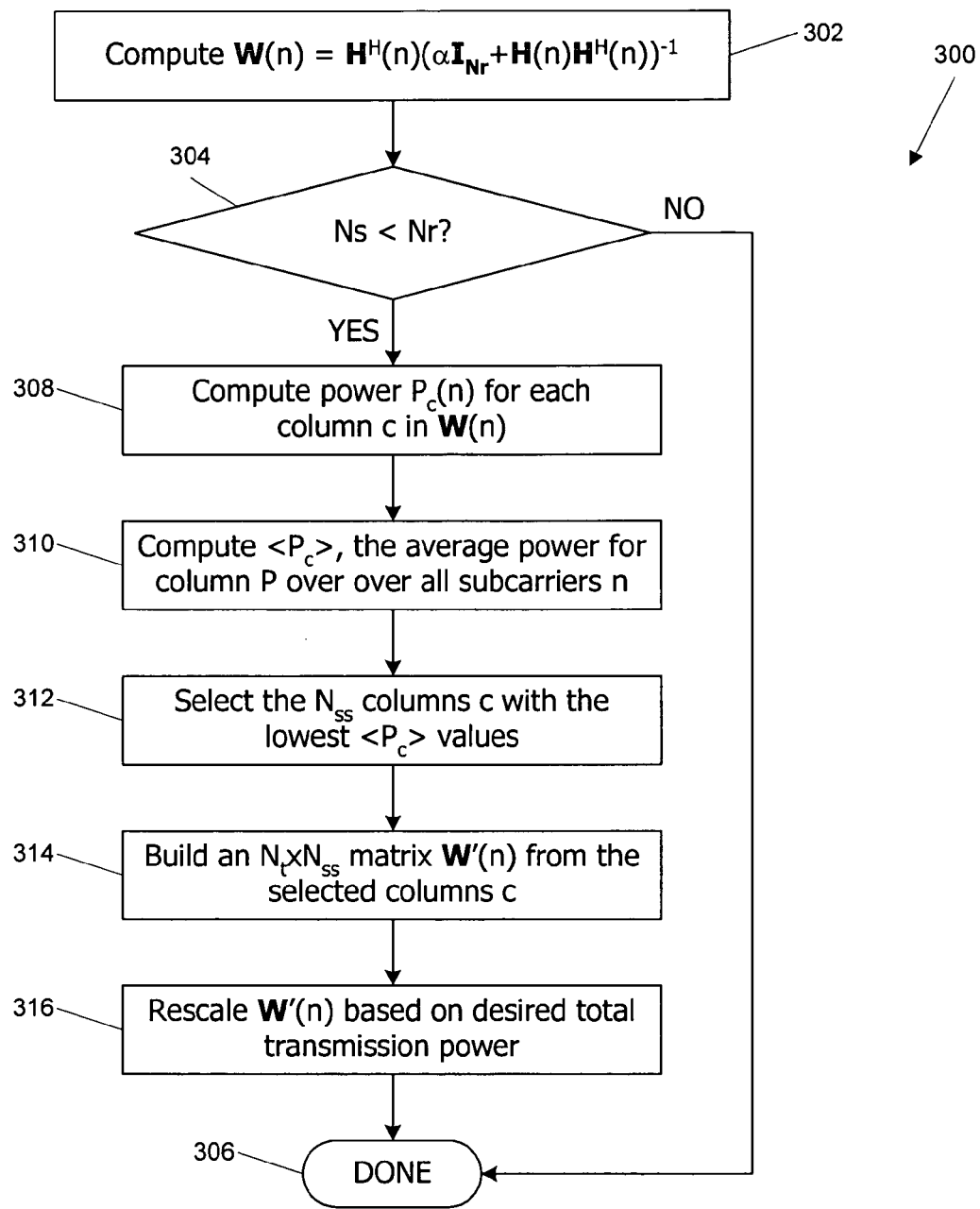
FIG. 3 is a flow diagram of a process for minimum mean-square error (MMSE) beamforming according to an embodiment of the present invention.

FIG. 3 is a flow diagram of a process 300 for MMSE beamforming according to an embodiment of the present invention. At step 302, a conventional MMSE technique is used to compute a BF weight matrix as:

$$W(n) = H^H(n)(\alpha I_{N_r} + H(n)H^H(n))^{-1}, \quad \text{(Eq. 8)}$$

where $I_{N_r}$ is the $N_r \times N_r$ identity matrix and $\alpha$ is a complex scale factor chosen to prevent division by zero during the matrix inversion. Suitable techniques for choosing the scale factors are known in the art and maybe employed at step 302. As is known in the art, this MMSE technique tends to equalize the channel response.

At step 304, it is determined whether the number $N_{ss}$ of signal streams is less than the number $N_r$ of receive antennas at the sink. If not, then further optimization is not done; process 300 exits (step 306), and W(n) of Eq. 8 is used as the BF weight matrix. If $N_{ss}$ is less than $N_r$, then power optimization is performed.

More specifically, at step 308 the power per column $P_c(n)$ is computed for each column c in matrix W(n). At step 310, $P_c(n)$ is averaged over all subcarriers n to determine the average power per column, $<P_c>$. At step 312, the $N_{ss}$ columns c with the lowest $<P_c>$ values are selected. These columns represent an "eigenmode" of the channel that can be equalized without expending significant power. At step 314, an $N_t \times N_{ss}$ BF weight matrix W'(n) is constructed using the selected columns c. At step 316, the BF weight matrix W'(n) may be rescaled such that the total transmit power matches a budgeted transmit power.

It will be appreciated that the power-optimized MMSE beamforming process described herein is illustrative and that variations and modifications are possible. Steps described as sequential may be executed in parallel, order of steps may be varied, and steps may be modified or combined.

SVD MMSE Beamforming

In still another embodiment of the present invention, BF weight matrices W(n) are determined using a combination of SVD and MMSE techniques to equalize the channel. In this technique, the SVD decomposition of the channel matrix H(n) is inverted and used as the channel weight.

Figure 4:
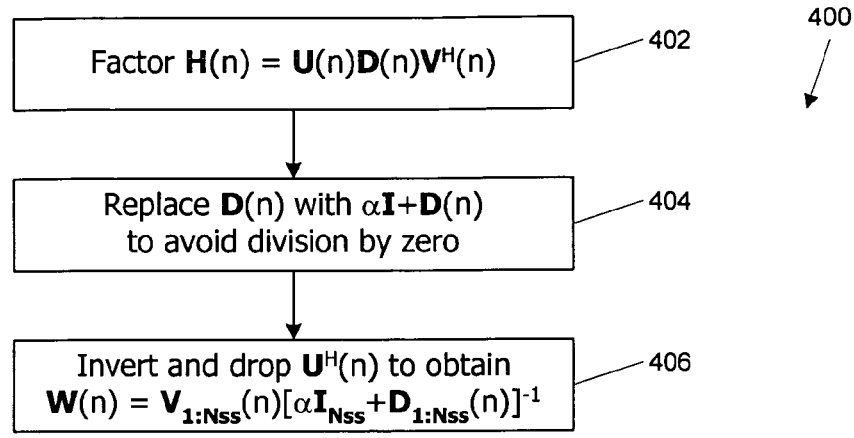
FIG. 4 is a flow diagram of an SVD MMSE beamforming process according to an embodiment of the present invention.

FIG. 4 is a flow diagram of an SVD MMSE beamforming process 400 according to an embodiment of the present invention. At step 402, the channel matrix H(n) is factored into unitary matrices:

$$H(n) = U(n)D(n)V^H(n), \quad \text{(Eq. 9)}$$

where U(n) and V(n) are unitary matrices with dimensions $N_r \times N_r$ and $N_t \times N_t$, respectively, and D(n) is an $N_r \times N_t$ matrix with the singular values $\sigma_1, \ldots, \sigma_K$ of H(n) on its main diagonal. As in process 200 of FIG. 2 described above, conventional SVD techniques may be used to factor the channel matrix.

At step 404, the singular-value matrix D(n) is replaced with a matrix $\alpha I + D(n)$, where I is an identity matrix of suitable dimension and $\alpha$ is a complex scale factor used to avoid division by zero during subsequent matrix inversion.

At step 406, the channel matrix of Eq. 9, as modified at step 404, is inverted to obtain:

$$W(n) = V(n)(\alpha I_N + D)(n))^{-1} U^H(n). \quad \text{(Eq. 10)}$$

Those skilled in the art will recognize that because U(n) is a unitary matrix, post-multiplication by $U^H(n)$ will not affect the channel properties as seen by the sink; accordingly, the factor $U^H(n)$ is advantageously dropped. In the case where $N_r = N_t = N_{ss} = N$, the result is:

$$W(n) = V(n)(\alpha I_N + D(n))^{-1}, \quad \text{(Eq. 11)}$$

where $I_N$ is the N×N identity matrix. More generally, $$W(n)=V_{1:N_{ss},1:N_{ss}}(n)(\alpha I_{N_{ss}}+D_{1:N_{ss},1:N_{ss}}(n))^{-1}, \qquad \text{(Eq. 12)}$$

where the subscript $1:N_{ss},1:N_{ss}$ denotes the upper-left $N_{ss} \times N_{ss}$ elements of the corresponding matrix.

It will be appreciated that the SVD MMSE beamforming process described herein is illustrative and that variations and modifications are possible. Steps described as sequential may be executed in parallel, order of steps may be varied, and steps may be modified or combined.

Limiting Impulse Response Time

In a further embodiment of the present invention, beamforming weights are adjusted to limit the impulse response time. Various techniques can be employed, examples of which will now be described.

Figure 5:
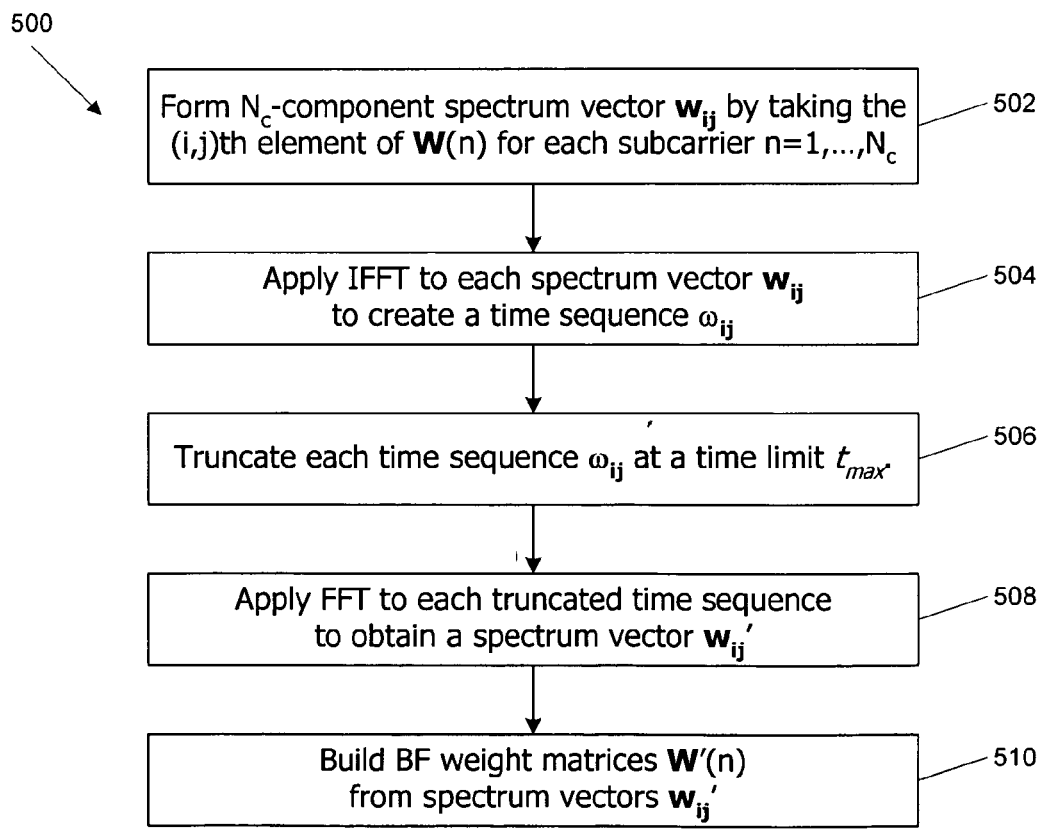
FIG. 5 is a flow diagram of a process for performing time-domain truncation for BF weights in a MIMO-OFDM device according to an embodiment of the present invention.

In one embodiment, frequency-domain BF weights are converted to time domain, truncated, then reconverted to frequency domain to produce a truncated BF weight matrix. FIG. 5 is a flow diagram of a process 500 for performing time-domain truncation for BF weights W(n) in a MIMO-OFDM source according to an embodiment of the present invention. In this example, each matrix W(n) for $n=1, \ldots, N_c$ is an $N_t \times N_{ss}$ matrix of complex scalars $w_{ij}(n)$, where subscript ij indicates a row index i and a column index j.

At step 502, a number $N_t * N_{ss}$ of $N_c$-component spectrum vectors $w_{ij}$ is formed. Each vector $w_{ij}$ has as its components, the set of scalars $w_{ij}(n)$ for $n=1, \ldots, N_c$. At step 504, an inverse FFT is applied to each spectrum vector $w_{ij}$ to create a time sequence $\omega_{ij}$. At step 506, each time sequence $\omega_{ij}$ is truncated at a cutoff time $t_{max}$, e.g., by setting all values in the time sequence $\omega_{ij}$ corresponding to times later than $t_{max}$ to zero. The cutoff time $t_{max}$ can be chosen for optimal performance based on system properties. For instance, in embodiments using MIMO-OFDM, the cutoff time $t_{max}$ is advantageously no longer than the OFDM guard time (e.g., 800 ns for IEEE 802.11a, 802.11g and 802.11n). Choosing a cutoff time $t_{max}$ that is too short, however, can reduce or eliminate the advantages of beamforming, particularly in frequency-selective channels. For IEEE 802.11 a/g/n systems, $t_{max}=400$ ns is a good compromise.

At step 508, an FFT is applied to each truncated time sequence to obtain a truncated spectrum vector $w_{ij}'$. At step 510, truncated BF weight matrices W'(n) are built from the spectrum vectors $w_{ij}'$. Specifically, each component $w_{ij}'(n)$ in the spectrum vector becomes the (i,j)th component of matrix W'(n).

It will be appreciated that the truncation processes described herein are illustrative and that variations and modifications are possible. Steps described as sequential may be executed in parallel, order of steps may be varied, and steps may be modified or combined. In one alternative embodiment, truncation is accomplished by smoothing or low-pass filtering in the frequency domain. Further, instead of applying a sharp cutoff as described above, windowing functions that provide a smooth transition to zero around the cutoff time (or cutoff frequency) can be applied.

Those skilled in the art will appreciate that impulse response limits may be applied to any MIMO BF weight matrix, regardless of how that matrix is generated; thus process 500 may be used in conjunction with any of the techniques described above, with conventional SVD or MMSE techniques, or with any other beamforming technique.

Limiting the impulse response may provide various advantages. For instance, in MIMO-OFDM systems, more compact training sequences can be used. In addition, to the extent that channel estimation performance (e.g., at the sink) depends on the impulse response time, a shorter impulse response generally results in better channel estimations. Further, limiting impulse response time at the source may improve backward compatibility with legacy sink devices (e.g., in the case of an IEEE 802.11n device, backward compatibility with IEEE 802.11a/g WLAN devices), as is the case where the channel estimation technique used by the sink device incorporates smoothing. It is also to be understood that limiting the impulse response time is not a requirement of the present invention.

Power Normalization

In a further embodiment of the present invention, beamforming weights are adjusted to normalize the transmitter power. Power may be normalized per transmit antenna or per signal stream.

Figure 6:
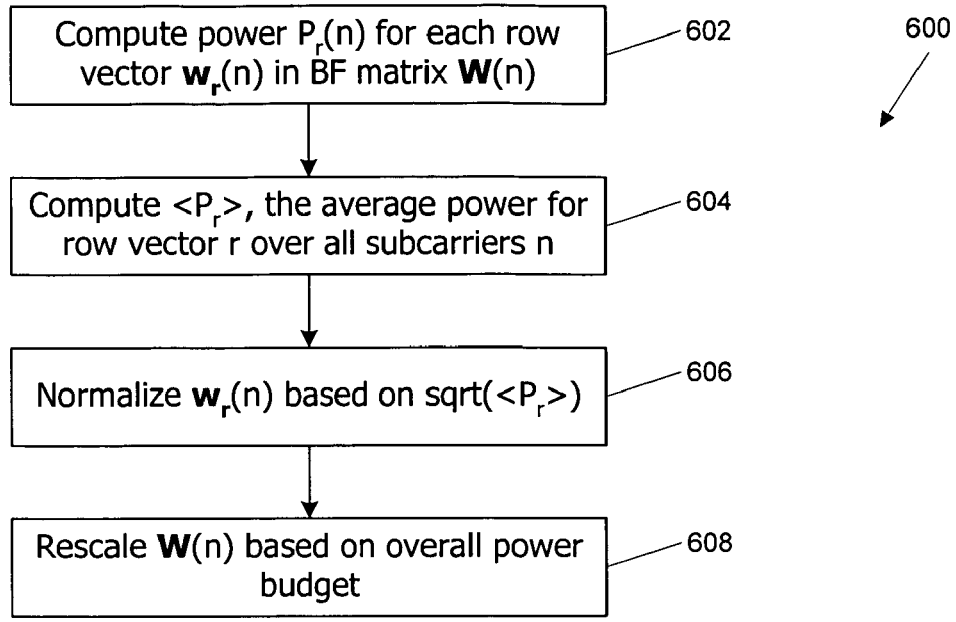
FIG. 6 illustrates a process for power normalization per transmit antenna according to an embodiment of the present invention.

FIG. 6 illustrates a process 600 for power normalization per transmit antenna according to an embodiment of the present invention. At step 602, the power $P_r(n)$ for each row of a BF matrix W(n) is determined. At step 604, the per-row power values $P_r(n)$ are each averaged over all subcarriers $n=1, \ldots, N_c$ to obtain a set of average power values $<P_r>$. At step 606, each row of matrix W(n) is normalized by dividing each element $w_{rj}$ in the row by the square root of the average power $<P_r>$ associated with the row. At step 608, the matrix W(n) is rescaled based on an overall link (or power) budget.

Figure 7:
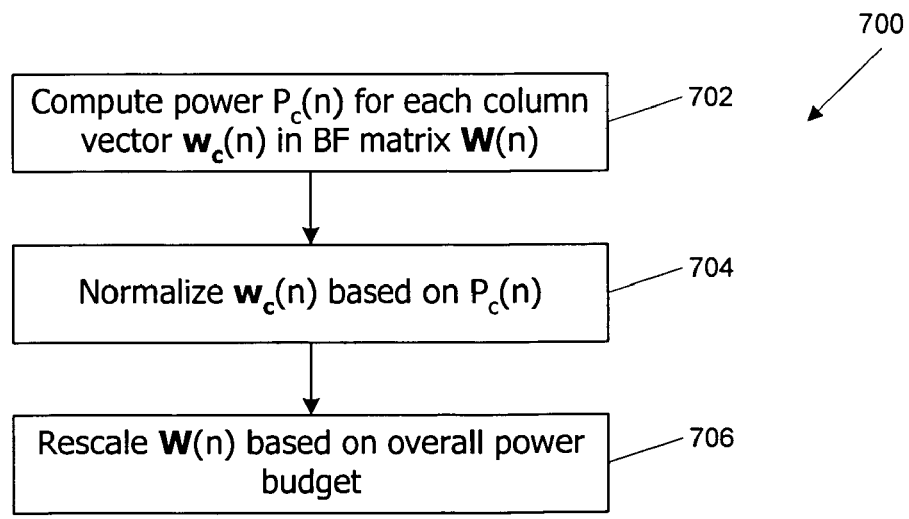
FIG. 7 illustrates a process for power normalization per spatial stream according to an embodiment of the present invention.

FIG. 7 illustrates a process 700 for power normalization per spatial stream according to another embodiment of the present invention. At step 702, the power $P_c(n)$ for each column of a BF matrix W(n) is determined. At step 704, each column of matrix W(n) is normalized based on $P_c(n)$ for that column, e.g., by dividing the elements of each column by the square root of the power $P_c(n)$ for that column. At step 706, the matrix W(n) is rescaled based on an overall link (or power) budget.

It will be appreciated that the power normalization processes described herein are illustrative and that variations and modifications are possible. Steps described as sequential may be executed in parallel, order of steps may be varied, and steps may be modified or combined. The final rescaling step in either process may be omitted in some embodiments.

Those skilled in the art will appreciate that power normalization may be applied to any MIMO BF weight matrix, regardless of how that matrix is generated; thus processes 600 or 700 may be used in conjunction with any of the techniques described above, with conventional SVD or MMSE techniques, or with any other beamforming technique.

Further, power normalization may be used together with impulse-response truncation (e.g., process 500 described above). Where both are used together, truncation is advantageously performed prior to power normalization.

Power normalization per spatial stream may be advantageously used with equalization-based BF techniques such as MMSE and related techniques. It should be noted that per-stream power normalization advantageously supports the use of variable data filling (VDF) techniques in conjunction with equalization-based BF. As is known in the art, a VDF source may change its power and/or data rate per spatial stream in connection with applying beamforming weights. At appropriate times, the source advantageously sends to the sink information as to the data rate in each stream, and the sink uses this information to decode each spatial stream appropriately.

To add VDF capability to equalization-based beamforming (e.g., conventional MMSE or the novel SVD MMSE or improved MMSE processes described above), the transmitter may normalize the columns of W(n) using the square root of the power per column $P_c(n)$, e.g., at step 704 of process 700 described above. In this example, an eigenmode that requires significant power to be equalized is given a lower data rate instead of all the power it would need for equalization. The data rate may be determined based in part on the amount of power needed to equalize the eigenmode.

It will also be appreciated that applying power normalization per transmitter may offset some of the improvement expected from the beamforming techniques described herein. However, in cases where the gain in link budget obtained by power normalization outweighs any loss incurred by modifying the beamforming, a net performance improvement is still realized.

Further Embodiments

While the invention has been described with respect to specific embodiments, one skilled in the art will recognize that numerous modifications are possible. For instance, the components and algorithms described herein may be implemented using hardware, software, or any combination of hardware and/or software elements.

A source may communicate with multiple sinks, and such a source may compute and/or store separate BF weight matrices for each sink with which it communicates. The source may update the BF weight matrices from time to time, e.g., if the channel properties change due to motion of the source and/or sink devices. Conventional techniques for detecting time variations in channel properties may be employed in the source and/or sink, or the source may be configured to periodically recompute the BF weights.

A source that employs beamforming is not required to beamform every transmission it makes. For example, if all or part of a transmitted packet needs to be received by more than one device in a communication system, that packet (or portion of a packet) might be transmitted without beamforming.

As noted above, a device may operate as a source at some times and as a sink at other times. In such a system, one device might beamform when it acts as a source while another device does not, or all devices might beamform when acting as sources. Each beamforming source in the system advantageously determines its own BF weights. A device acting as a sink generally does not need to know whether or how beamforming is being employed at the source, and the present invention does not require transmission of such information. (In the case where VDF is employed in connection with beamforming, the source generally does need to communicate data-rate information for each spatial stream to the sink.)

Impulse-response truncation and/or power normalization, e.g. as described above, might or might not be employed in a beamforming source. Devices in a MIMO communication system may be implemented with configurable beamforming parameters, allowing performance of sources and sinks to be tuned for a particular combination of devices, protocols and operating environments. For instance, it may be possible to select among different BF algorithms or to enable or disable impulse-response truncation and/or power normalization.

Thus, although the invention has been described with respect to specific embodiments, it will be appreciated that the invention is intended to cover all modifications and equivalents within the scope of the following claims.

What is claimed is:

1. In a multiple input multiple output (MIMO) communication system including a source device that transmits, via a number $N_t$ of transmit antennas, a beamformed signal to a sink device, a beamforming method for the source device, the method comprising:

employing a processor executing computer readable instructions to perform the following acts:

determining a set of beamforming weights to be applied to a number $N_{ss}$ of signal streams to generate a number $N_t$ of transmit streams, wherein the number $N_{ss}$ is at least two, wherein the act of determining includes:

computing a singular value decomposition of a channel matrix H associated with a communication channel from the source device to the sink device;

defining a preliminary weight matrix based on the singular value decomposition; and phase-rotating each column of the preliminary weight matrix such that a phase of a reference element in each column is equal to a target phase, thereby generating the set of beamforming weights;

applying the set of beamforming weights to the number $N_{ss}$ of signal streams to generate the number $N_t$ of transmit streams; and transmitting the number $N_t$ of transmit streams via the number $N_t$ of transmit antennas.

2. The method of claim 1, wherein the source device transmits signals to the sink device using a plurality of subcarriers, the method further comprising:

performing the act of determining the set of beamforming weights independently for each of the plurality of subcarriers.

3. The method of claim 2, wherein for each subcarrier n in the plurality of subcarriers, the act of computing the singular value decomposition of the channel matrix H(n) associated with the subcarrier n includes:

factoring the channel matrix H(n) into a product H(n)=U(n)D(n)$V^H$(n), wherein U(n) and V(n) are unitary matrices, $V^H$(n) is a Hermetian transpose of matrix V(n) and D(n) is a matrix in which singular values of the channel matrix H(n) appear on a main diagonal thereof.

4. The method of claim 3, wherein defining the preliminary weight matrix includes:

defining, as the preliminary weight matrix, a matrix that includes at least a subset of columns of the matrix $V^H$(n).

5. The method of claim 2, wherein the act of phase-rotating each column of the preliminary weight matrix is performed for respective weight matrices associated with each one of the subcarriers, and wherein elements in corresponding locations in the respective weight matrices are used as the reference elements for each weight matrix.

6. The method of claim 1, further comprising:

prior to applying the set of beamforming weights, modifying the set of beamforming weights so as to normalize a power consumption per transmit antenna, wherein the modified set of beamforming weights, and not the set of beamforming weights is applied during the act of applying.

7. The method of claim 1, further comprising:

prior to applying the set of beamforming weights, modifying the set of beamforming weights so as to normalize a power consumption per signal stream, wherein the modified set of beamforming weights, and not the set of beamforming weights, is applied during the act of applying.

8. The method of claim 1, further comprising:
prior to applying the set of beamforming weights, modifying the set of beamforming weights so as to truncate an impulse response length associated with the set of beamforming weights, wherein the modified set of beamforming weights, and not the set of beamforming weights, is applied during the act of applying.

9. In a multiple input, multiple output (MIMO) communication system including a source device that transmits, via a number $N_t$ of transmit antennas, a beamformed signal to a sink device, a beamforming method for the source device, the method comprising:
employing a processor executing computer readable instructions to perform the following acts:
determining a beamforming weight matrix W to be applied to a number $N_{ss}$ of signal streams to generate a number $N_t$ of transmit streams, wherein the number $N_{ss}$ is at least two, wherein the act of determining includes:
computing an initial beamforming weight matrix using a minimum mean square error technique; and
if the number $N_{ss}$ of signal streams is less than a number $N_r$ of receive antennas:
optimizing the initial beamforming weight matrix by selecting a number $N_{ss}$ of columns in the initial beamforming weight matrix for which a minimum power is required to equalize a channel; and
determining the optimized beamforming weight matrix to be the beamforming weight matrix W;
if the number $N_{ss}$ of signal streams is not less than a number $N_r$ of receive antennas:
determining the initial beamforming weight matrix to be the beamforming weight matrix W;
applying the beamforming weight matrix to the number $N_{ss}$ of signal streams to generate the number $N_t$ of transmit streams; and
transmitting the number $N_t$ of transmit streams via the number $N_t$ of transmit antennas.

10. The method of claim 9, wherein the act of determining the beamforming weight matrix W includes:
computing a matrix $W=H^H(\alpha I+HH^H)^{-1}$, wherein H is a channel matrix characterizing a channel between the source device and the sink device, $H^H$ is a Hermetian transpose of the channel matrix H, I is an identity matrix, and $\alpha$ is a complex scale factor chosen to prevent division by zero during the matrix inversion operation.

11. The method of claim 9, wherein the source device transmits signals to the sink device using a plurality of subcarriers, the method further comprising:
computing a beamforming matrix W(n) for each of the subcarriers n.

12. The method of claim 11, wherein selecting the number $N_{ss}$ of columns in the beamforming weight matrix W(n) for each subcarrier includes:
determining a power value $P_C(n)$ for each column of each beamforming weight matrix W(n);
averaging respective power values $P_C(n)$ of corresponding columns in the beamforming weight matrices W(n) over all subcarriers n; and
selecting, in each beamforming weight matrix W(n), the number $N_{ss}$ of columns with lowest average power values.

13. The method of claim 9, further comprising:
prior to applying the beamforming weight matrix W, modifying the beamforming weight matrix W so as to normalize a power consumption per transmit antenna, wherein the modified beamforming weight matrix, and not the beamforming weight matrix W, is applied during the act of applying.

14. The method of claim 9, further comprising:
prior to applying the beamforming weight matrix W, modifying the beamforming weight matrix W so as to normalize a power consumption per signal stream, wherein the modified beamforming weight matrix, and not the beamforming weight matrix W, is applied during the act of applying.

15. The method of claim 9, further comprising:
prior to applying the beamforming weight matrix W, modifying the beamforming weight matrix W so as to truncate an impulse response length associated with the beamforming weight matrix W, wherein the modified beamforming weight matrix, and not the beamforming weight matrix W, is applied during the act of applying.

16. In a multiple input, multiple out (MIMO) communication system including a source device that transmits, via a number $N_t$ of transmit antennas, a beamformed signal to a sink device, a beamforming method for the source device, the method comprising:
employing a processor executing computer readable instructions to perform the following acts:
determining a beamforming weight matrix W to apply to a number $N_{ss}$ of signal streams to generate a number $N_t$ of transmit streams, wherein the number $N_{ss}$ is at least two, wherein the act of determining includes:
computing a singular value decomposition of a channel matrix associated with a communication channel from the source device to the sink device, the singular value decomposition including a singular value matrix D and at least one unitary matrix U; and
determining the beamforming weight matrix W based on inverting a product matrix obtained from the unitary matrix U and the singular value matrix D;
applying the beamforming weight matrix W to the number $N_{ss}$ of signal streams to generate the number $N_t$ of transmit streams; and
transmitting the number $N_t$ of transmit streams via the number $N_t$ of transmit antennas.

17. The method of claim 16, wherein the source device transmits signals to the sink device using a plurality of subcarriers, the method further comprising:
performing the acts of computing the singular value decomposition and determining the beamforming weight matrix W independently for each of the plurality of subcarriers.

18. The method of claim 17, wherein for each subcarrier n in the plurality of subcarriers, the act of computing the singular value decomposition of the channel matrix H(n) associated with the subcarrier n includes:
factoring the channel matrix H(n) into a product $H(n)=U(n)D(n)V^H(n)$, wherein U(n) and V(n) are unitary matrices, $V^H(n)$ is a Hermetian transpose of matrix V(n) and D(n) is a matrix in which singular values of the channel matrix H(n) appear on a main diagonal thereof.

19. The method of claim 18, wherein for each subcarrier n in the plurality of subcarriers, determining a beamforming weight matrix W(n) associated with the subcarrier n includes:
computing $W(n)=V(n)(\alpha I+D(n))^{-1}$, wherein I is an identity matrix and $\alpha$ is a complex scale factor chosen to prevent division by zero during the matrix inversion operation.

20. The method of claim 19, wherein, if a number $N_r$ of receive antennas, the number $N_t$ of transmit antennas, and the number $N_{ss}$ of signal streams are not equal to one another, the matrices V(n) and D(n) are respectively represented by truncated versions of the matrices V(n) and D(n), wherein the truncated versions are equal to upper-left $N_{ss} \times N_{ss}$ elements of V(n) and D(n), the matrices V(n) and D(n) being respectively represented by the truncated versions prior to the act of computing $W(n)=V(n)(\alpha I+D(n))^{-1}$.

21. The method of claim 16, further comprising:
prior to applying the beamforming weight matrix W, modifying the beamforming weight matrix W so as to normalize a power consumption per transmit antenna, wherein the modified beamforming weight matrix, and not the beamforming weight matrix W, is applied during the act of applying.

22. The method of claim 16, further comprising:
prior to applying the beamforming weight matrix W, modifying the beamforming weight matrix W so as to normalize a power consumption per signal stream, wherein the modified beamforming weight matrix, and not the beamforming weight matrix W, is applied during the act of applying.

23. The method of claim 16, further comprising:
prior to applying the beamforming weight matrix W, modifying the beamforming weight matrix W so as to truncate an impulse response length associated with the beamforming weight matrix W, wherein the modified beamforming weight matrix, and not the beamforming weight matrix W, is applied during the act of applying.

24. In a multiple input, multiple output (MIMO) communication system including a source device that transmits, via a number $N_t$ of transmit antennas, a beamformed signal to a sink device, a beamforming method for the source device, the method comprising:
employing a processor executing computer readable instructions to perform the following acts:
determining a set of beamforming weights to apply to a number $N_{ss}$ of signal streams to generate a number $N_t$ of transmit streams, wherein the number $N_{ss}$ is at least two;
truncating an impulse response time associated with the set of beamforming weights;
applying the truncated-response set of beamforming weights to the number $N_{ss}$ of signal streams to generate the number $N_t$ of transmit streams; and
transmitting the number $N_t$ of transmit streams via the number $N_t$ of transmit antennas.

25. The method of claim 24, wherein the source device transmits signals to the sink device using a plurality of subcarriers and wherein the act of determining a set of beamforming weights is performed for each subcarrier, thereby generating a plurality of beamforming weight matrices W(n).

26. The method of claim 25, wherein the act of truncating includes:
converting the set of beamforming weights to a time domain representation, thereby producing a set of time-domain weights;
truncating the set of time-domain weights at a cutoff time; and
converting the truncated set of time-domain weights to a frequency domain representation, thereby producing the truncated-response set of beamforming weights.

27. In a multiple input, multiple output (MIMO) communication system including a source device that transmits, via a number $N_t$ of transmit antennas, a beamformed signal to a sink device, a beamforming method for the source device, the method comprising:
employing a processor executing computer readable instructions to perform the following acts:
determining a set of beamforming weights to apply to a number $N_{ss}$ of signal streams to generate a number $N_t$ of transmit streams, wherein the number $N_{ss}$ is at least two;
normalizing the set of beamforming weights, wherein normalizing the set of beamforming weights optimizes power required per signal stream;
applying the normalized set of beamforming weights to the number $N_{ss}$ of signal streams to generate the number $N_t$ of transmit streams; and
transmitting the number $N_t$, of transmit streams via the number $N_t$ of transmit antennas.

28. In a multiple input, multiple output (MIMO) communication system including a source device that transmits, via a number $N_t$ of transmit antennas, a beamformed signal to a sink device, a beamforming method for the source device, the method comprising:
employing a processor executing computer readable instructions to perform the following acts:
determining a set of beamforming weights to apply to a number $N_{ss}$ of signal streams to generate a number $N_t$ of transmit streams, wherein the number $N_{ss}$ is at least two;
normalizing the set of beamforming weights to optimize power required per each of the number $N_t$ of transmit antennas;
rescaling the set of normalized beamforming weights;
applying the rescaled set of normalized beamforming weights to the number $N_{ss}$ of signal streams to generate the number $N_t$ of transmit streams; and
transmitting the number $N_t$ of transmit streams via the number $N_t$ of transmit antennas.

* * * * *